United States Patent
Singla et al.

(10) Patent No.: US 11,449,599 B2
(45) Date of Patent: Sep. 20, 2022

(54) MEMORY CARD SYSTEM WITH IMPROVED PASSWORD RESET METHOD

(71) Applicant: Western Digital Technologies, Inc., San Jose, CA (US)

(72) Inventors: Lovish Singla, Karnataka (IN); Prathika Vinayak, Karnataka (IN); Sandeep Singh, Karnataka (IN); Akash Kumar, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 543 days.

(21) Appl. No.: 16/577,055

(22) Filed: Sep. 20, 2019

(65) Prior Publication Data
US 2021/0089641 A1 Mar. 25, 2021

(51) Int. Cl.
*G06F 21/46* (2013.01)
*G06F 3/06* (2006.01)

(52) U.S. Cl.
CPC ............ *G06F 21/46* (2013.01); *G06F 3/0622* (2013.01); *G06F 3/0659* (2013.01); *G06F 3/0679* (2013.01)

(58) Field of Classification Search
CPC ...................................................... G06F 21/46
See application file for complete search history.

(56) References Cited

PUBLICATIONS

Micron: TN-SD-01: Enabling SD/uSD Card Lock/Unlock in Linux® Introduction; Aug. 2017 (Year: 2017).*

* cited by examiner

*Primary Examiner* — James R Turchen
(74) *Attorney, Agent, or Firm* — Michael Best & Friedrich LLP

(57) ABSTRACT

Systems, devices, and methods for resetting a current password of a memory device or a memory card system. The method includes receiving a data block including a content field, a combined password length of a user-defined current password and a new password, and a user-defined password length of the new password. The content field includes the user-defined current password and the new password. The method also includes determining a system calculated password length of the new password based at least on the combined password length and a length of the current password. The method further includes matching the system calculated password length and the user-defined password length and comparing the user-defined current password with the current password. The method also includes replacing or resetting the current password with the new password based on a result of the matching and a result of the comparing.

20 Claims, 10 Drawing Sheets

| BYTE # | BIT 7 | BIT 6 | BIT 5 | BIT 4 | BIT 3 | BIT 2 | BIT 1 | BIT 0 |
|---|---|---|---|---|---|---|---|---|
| 0 | RESERVED (SHALL BE SET TO 0) | | | COP | ERASE | LOCK UNLOCK | CLR_PWD | SET_PWD |
| 1 | PWDS_LEN | | | | | | | |
| 2 ........ PWDS_LEN + 1 | PASSWORD DATA | | | | | | | |

| STORED CURRENT PASSWORD | 1 | 2 | 3 | | ← 302 |
|---|---|---|---|---|---|
| USER INPUTTED CURRENT PASSWORD | 1 | 2 | 3 | 4 | ← 304 |
| NEW PASSWORD | 3 | 4 | 5 | 6 | ← 306 |
| LENGTH CALCULATED BY THE SYSTEM OF NEW PASSWORD | 8-3 = 5 | | | | ← 308 |
| RESULT | LOCKED SUCCESSFULLY WITH PASSWORD  4 3 4 5 6 | | | | ← 310 |

| STORED CURRENT PASSWORD | 1 | 2 | 3 | ← 352 |
|---|---|---|---|---|
| USER INPUTTED CURRENT PASSWORD | 1 | 2 | | ← 354 |
| NEW PASSWORD | 3 | 4 | 5 6 | ← 356 |
| LENGTH CALCULATED BY THE SYSTEM OF NEW PASSWORD | 6-3 = 3 | | | ← 358 |
| RESULT | LOCKED SUCCESSFULLY WITH PASSWORD  4 5 6 | | | ← 360 |

| | | |
|---|---|---|
| CURRENT PASSWORD | 1 2 3 | ← 602 |
| USER-DEFINED CURRENT PASSWORD | 1 2 3 4 | ← 604 |
| NEW PASSWORD AND USER-DEFINED PASSWORD LENGTH ($L_{USER}$) OF THE NEW PASSWORD | 3 4 5 6 & 4 | ← 606 |
| SYSTEM CALCULATED LENGTH OF THE NEW PASSWORD ($L_{SYS}$) | 8-3 = 5 | ← 608 |
| MATCH BETWEEN $L_{SYS}$ AND $L_{USER}$ | NO | ← 610 |
| RESULT | LOCK_UNLOCK FAILED ERROR BIT WILL BE SET | ← 612 |

FIG. 6A  600

| | | |
|---|---|---|
| CURRENT PASSWORD | 1 2 3 | ← 632 |
| USER-DEFINED CURRENT PASSWORD | 1 2 | ← 634 |
| NEW PASSWORD AND USER-DEFINED PASSWORD LENGTH ($L_{USER}$) OF THE NEW PASSWORD | 3 4 5 6 & 4 | ← 636 |
| SYSTEM CALCULATED LENGTH OF THE NEW PASSWORD ($L_{SYS}$) | 6-3 = 3 | ← 638 |
| MATCH BETWEEN $L_{SYS}$ AND $L_{USER}$ | NO | ← 640 |
| RESULT | LOCK_UNLOCK FAILED ERROR BIT WILL BE SET | ← 642 |

FIG. 6B  630

MEMORY CARD SYSTEM WITH IMPROVED PASSWORD RESET METHOD

BACKGROUND

This application relates generally to memory card systems and, more particularly, to techniques for resetting a password of a memory card system.

Flash memory cards are widely used for storing digital content such as video, audio, and images. One example of a flash memory card is a Secure-Digital (SD) card, which uses an SD memory card format. The SD memory card format is an extension of an earlier MultiMediaCard (MMC) format. In general, SD cards use a lock/unlock feature to enable a host system to prevent illegal or unauthorized access to data stored in the SD cards. The SD cards are locked/unlocked using a password. According to the SD standard, for example, the SD Association Physical layer Specification version 6.0, an SD card also has the ability to reset the current password of the SD card with a suitable command, which includes both the current password and the new password as provided by the user. However, if an unknown password that is different from the new password is used, there is a possibility of the SD card being locked, while a user tries to reset the current password. Such a scenario may occur when the user enters additional characters at the end of the current password, or when the user misses one or more characters of the current password and the missed characters are the same as the start of the new password. Such undesirable locking of the SD cards is due to the structure stated in the SD Association Physical layer Specification version 6.0 to store the current password and due to of the use of variable length passwords. Once the SD card is locked with the incorrect password, the only operation that can be performed to re-use the SD card is to erase the content of the SD card, which may be an undesirable step for the user.

Therefore, there is a need to preclude unintended locking of a memory card during the password reset process and to avoid scenarios in which the memory card enters an inoperable state.

SUMMARY

The disclosure provides a method of resetting a current password of a memory device. The method includes receiving a data block from a host device. The data block includes at least a content field, a combined password length of a user-defined current password and a new password, and a user-defined password length of the new password. The content field includes the user-defined current password and the new password. The method also includes determining a system calculated password length of the new password based at least on the combined password length and a length of the current password. The method further includes matching the system calculated password length and the user-defined password length. The method also includes comparing the user-defined current password with the current password. The method further includes replacing the current password with the new password based on a result of the matching and a result of the comparing.

The disclosure also provides a memory device including, in one embodiment, a memory and a controller. The controller is operatively coupled to the memory via a memory interface. The controller is configured to receive a data block from a host device via a card interface. The data block includes at least a content field, a combined password length of a user-defined current password and a new password, and a user-defined password length of the new password. The content field includes the user-defined current password and the new password. The controller is further configured to determine a system calculated password length of the new password based at least on the combined password length and a length of a current password. The controller is also configured to match the system calculated password length and the user-defined password length. The controller is further configured to compare the user-defined current password with the current password. The controller is also configured to reset the current password with the new password based on a result of the match and a result of the comparing.

The disclosure also provides a memory card system including, in one embodiment, a memory card. The memory card includes a memory for storing data and a control means operatively coupled to the memory by way of a memory interface. The control means includes means for receiving a data block via a card interface. The data block includes at least a content field, a combined password length of a user-defined current password and a new password, and a user-defined password length of the new password. The content field includes the user-defined current password and the new password. The control means also includes means for determining a system calculated password length of the new password based at least on the combined password length and a length of the current password. The control means further includes means for matching the system calculated password length and the user-defined password length. The control means also includes means for comparing the user-defined current password with the current password. The control means further includes means for replacing the current password with the new password based on a result of the matching and a result of the comparing.

BRIEF DESCRIPTION OF THE DRAWINGS

FIG. 3A illustrates a representation of an example of an incorrect password reset in the SD card as per the SD standard.

FIG. 3B illustrates a representation of another example of an incorrect password reset in the SD card as per the SD standard.

FIGS. 6A, 6B, and 6C illustrate examples of resetting a current password in a memory device, in accordance with some embodiments.

DETAILED DESCRIPTION

In the following description, numerous specific details are set forth in order to provide an understanding of one or more aspects of the present disclosure. It will be readily apparent to one skill in the art that these specific details are merely exemplary and not intended to limit the scope this application.

Figures 1, 2:
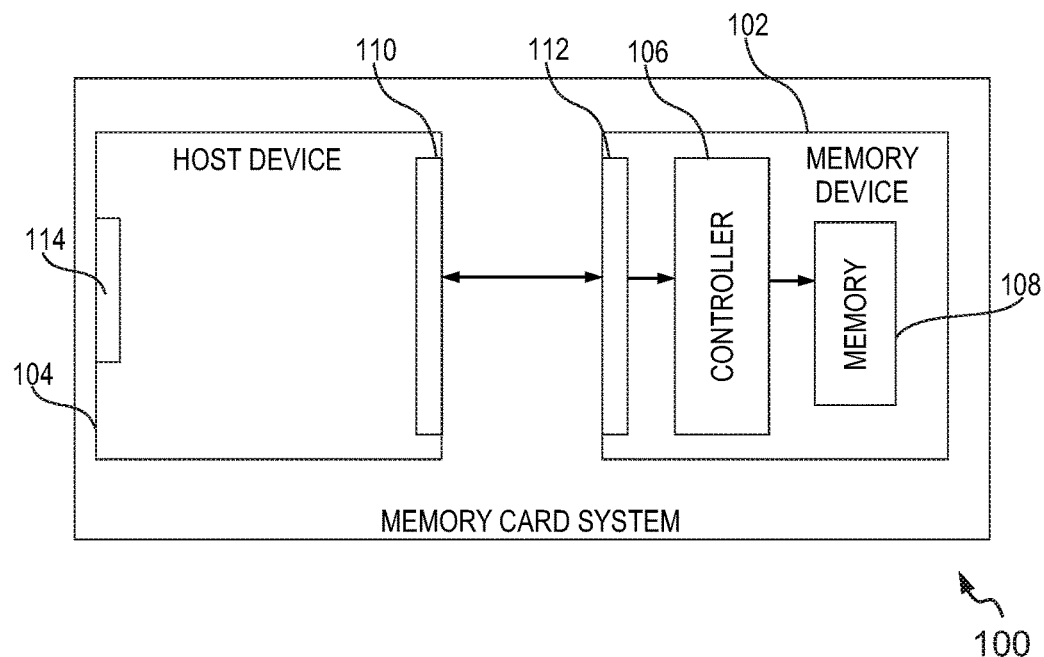
FIG. 1 is a block diagram of a conventional memory card system.
FIG. 2 is a representation of locked card data structure according to an SD standard such as SD Association Physical layer Specification version 6.0.

Referring now to FIG. 1, a conventional memory card system 100 includes a memory device 102 (for example, an SD card) and a host device 104. The host device 104 controls data processing operations such as a read and write operations. The host device 104 may have a user interface 114 and a host interface 110. The memory device 102 includes a controller 106 and a memory 108. The memory 108 is a non-volatile memory such as, but not limited to, a Secure Digital (SD) card, a micro Secure Digital (micro-SD) card, or a MultiMedia Card (MMC)). The memory 108 may take the form of an embedded mass storage device, such as an eSD embedded flash drive, embedded in the host device 104.

In one example, the host device 104 may have an SD slot and SD driver software installed thereon for controlling the operation of the SD memory card.

According to the SD standard, SD/microSD cards have a lock/unlock function, which enables the host device 104 to lock or unlock the memory device 102. The host device 104, as illustrated in FIG. 1, sends a command signal to the controller 106 via a command line, through the host interface 110. The memory card system 100 uses the SD bus protocol for data transmission and reception. In the SD bus protocol, a command is transferred serially from the host device 104 on Command (CMD) line to the controller 106 via a card interface 112 and as an answer to a previously received command, the controller 106 sends a response serially on the CMD line. In an example, data transfer to/from the memory device 102 is done in blocks. In an example, the data blocks are succeeded by cyclic redundancy check (CRC) bits. The host device 104 sends a command such as a CMD7 command to select an SD card from a plurality of SD cards. Further, the host device 104 sends another command such as a CMD42 command to the controller 106 to lock/unlock and/or reset the current password of the selected SD card. The CMD42 command has the same structure and bus transaction type as a regular single block write command. The CMD42 command includes all required information as per the SD standard such as a password setting mode, a user inputted current password, a new password, etc. The CMD42 command is described further with reference to FIG. 2.

Referring to FIG. 2, a locked card data structure 200 is disclosed in accordance with the SD standard. The locked card data structure 200 includes a plurality of byte fields. A byte field 202 is called as a command register in which bit 0 defines password setting mode (see, SET PWD), bit 1 is used for clear password (see, CLR_PWD), bit 2 represents locking/unlocking status (see, LOCK UNLOCK) of the SD card, bit 3 defines force erase operation (see, ERASE), bit 4 indicates Card Ownership Protection (COP) feature operations (see, COP), and bits 5-7 are reserved bits. The reserved bits are ordinarily set to a pre-defined state for example, 0. According to the SD standard, a memory card system such as the memory card system 100 can be of two types: COP card and non-COP card. The COP card has an additional feature that prevents re-use of the COP card without knowing the Force Erase Password (FEP). The FEP is stored in an additional 128-bit register with an 8-bit FEP_LEN register. Once the FEP is set, it disables the "Force Erase" and "Clear Password" operations. Further, a COP unlock is required to operate the SD card after power-up when the FEP is set. For the COP unlock, CMD42 with hexadecimal value "1FH" is sent to the memory device 102 to enable any other CMD42 functions.

A PWDS_LEN byte field 204 defines a password length of a password, which is inputted by the user. A password data field 206 represents the content of the user-inputted password. To reset a current password of the SD card, the PWDS_LEN byte field 204 includes total password length of user inputted current password (currently used by user) and a new password, and the password data field 206 includes the content of the user inputted current password followed by the content of the new password, for example, [user inputted current password:new password]. The length of the new password is calculated internally by subtracting the length of a stored current password (accessed from the memory 108) from the total password length accessed from the PWDS_LEN byte field 204.

Referring again to FIG. 1, in the existing SD standard, while changing (or resetting) the password of the memory device 102, the user enters the user inputted current password followed by the new password, for example, [user inputted current password:new password], via the user interface 114, on the host device 104. The host device 104 generates the CMD42 command based on inputs from the user, and sends the CMD42 command to the controller 106. The controller 106 calculates a length of the new password internally by subtracting a length of the stored current password (accessed from the memory 108) from the total password length accessed from the PWDS_LEN byte field 204 present in the CMD42 command. The controller 106 has length information of the stored current password, and the controller 106 extracts the user inputted current password from the password data field 206 of the CMD42 command based on the length of the stored current password, and the remaining characters of the password data field 206 can be considered as the new password intended by the user to reset the password of the memory device 102. For instance, if the length of the stored current password is "3", and the password data field 206 of the CMD42 command includes eight characters, the controller 106 extracts the first three characters from the password data field 206 as the user inputted current password. The controller 106 calculates a length of the new password as equal to the length of the remaining characters i.e. 5. The controller 106 matches the extracted characters with the stored current password accessed from the memory 108. If the content of the extracted password (i.e. the user inputted current password in CMD42 command) and the stored current password match, the remaining five characters of the password data field of the CMD42 command are assumed to be the new password. These remaining characters are used to reset the stored current password. If the content of the extracted password and the stored current password do not match, a Lock_Unlock_Failed error bit (not shown) will be set in a status register, which indicates that the password reset of the memory device 102 was not successful.

During the password reset operation in the memory device 102, there may be some scenarios of the memory device 102 getting locked with an unknown or unexpected password, like 1) when the user inputs extra characters following an old or existing password (see FIG. 3A), and 2)

when the last few characters of the old or existing password are skipped, but the skipped characters happen to be the first few characters of the new password (see FIG. 3B).

In one example, as illustrated in FIG. 3A, the user intends to reset a current password which is "123" (see, 302). The user enters the current password (i.e. user inputted current password) followed by the new password. In the illustrated example shown in FIG. 3A, the user provides an incorrect current password, for example, the user includes an extra character to the stored current password (see, 304). For instance, the actual current password is "123", and the user provides the current password as "1234", which has an extra character i.e. "4". The user also provides the new password as "3456" which is intended to reset the current password "123". After receiving the user inputs, the host device 104 generates the CMD42 command and sends the CMD42 command to the controller 106. In the CMD42 command, the PWDS_LEN byte field 204 has a value of the total password length that is equal to eight according to the example shown in FIG. 3A. The password data field 206 has the content of the user inputted current password followed by the new password i.e. "12343456". The controller 106 extracts a predetermined number of initial characters of the password data field 206 based on the length information of the stored current password which is "3". For instance, the controller 106 extracts "123". The controller 106 determines a match between the extracted content i.e. "123" and the content of actual current password, which are same in the illustrated example. The controller 106 calculates a length of the new password by subtracting a length of the current password i.e., "3" from the total password length i.e., "8". The length of the new password calculated by the system is "5" (see, 308 in FIG. 3A). Hence, the memory device 102 is locked successfully with a new password i.e. "43456", defined by the system, of password length "5" (see, 310 in FIG. 3A), which is different from the user-defined new password i.e. "3456" (see, 306 in FIG. 3A). In this example, the memory device 102 is locked by the password "43456", which is unknown to the user, and it leads the memory device 102 to an inoperable state.

In another example, as shown in FIG. 3B, the user intends to reset a current password which is "123" (see, 352). The user enters a current password (i.e. user inputted current password) followed by the new password. In the illustrated example shown in FIG. 3B, the user provides an incorrect current password, for example, the user misses to include the last character of the stored current password (see 354 in FIG. 3B). For instance, the actual current password is "123", and the user provides the current password as "12". Further, the user enters the new password i.e. "3456" which starts with the missed last character i.e. "3" of the stored current password (see 356 in FIG. 3B). The host device 104 generates the CMD42 command and sends the CMD42 command to the controller 106. In the CMD42 command, the PWDS_LEN byte field 204 has a value of the total password length that is equal to "6" according to the example shown in FIG. 3B. The password data field 206 has the content of the currently used password followed by the new password i.e., "123456". The controller 106 extracts a predetermined number of initial characters of the password data field 206 based on the length information of the current password which is "3". For instance, the controller 106 extract "123". Thereafter, the controller 106 determines a match between the extracted content i.e. "123" and the content of actual current password, which are same in the illustrated example. The controller 106 calculates a length of the new password by subtracting a length of the current password (i.e. "3") from the total password length (i.e. "6"). The new password length calculated by the system is "3" (see, 358 in FIG. 3B). Hence, the memory device 102 is locked successfully with a new password i.e. "456", defined by the system, of password length "3" (see, 360 in FIG. 3B), which is different from the user-defined new password i.e. "3456" (see, 356 in FIG. 3B). Hence, in this example, the memory device 102 is locked by the password "456", which is unknown to the user, and it leads the memory device 102 to an inoperable state.

In the above scenarios described in FIGS. 3A and 3B, the reset password is different from the user-defined new password. Accordingly, it is noted that the memory device 102 may be locked with an incorrect password while resetting the current password of the memory device 102 and may lead to an inoperable state in the above scenarios. Hence, to address these challenges and to provide other benefits, embodiments described herein provide a memory card system with an improved password changing (or resetting) method. More specifically, various embodiments described herein inputting a user-defined password length ($L_{USER}$) of the new password, instead of depending on a process of calculating a length of the new password by subtracting the length of the current password from the total password length, thereby preventing the memory device 102 from being locked by an incorrect password in a password reset process and enhancing the security of the memory card system.

Figure 4:
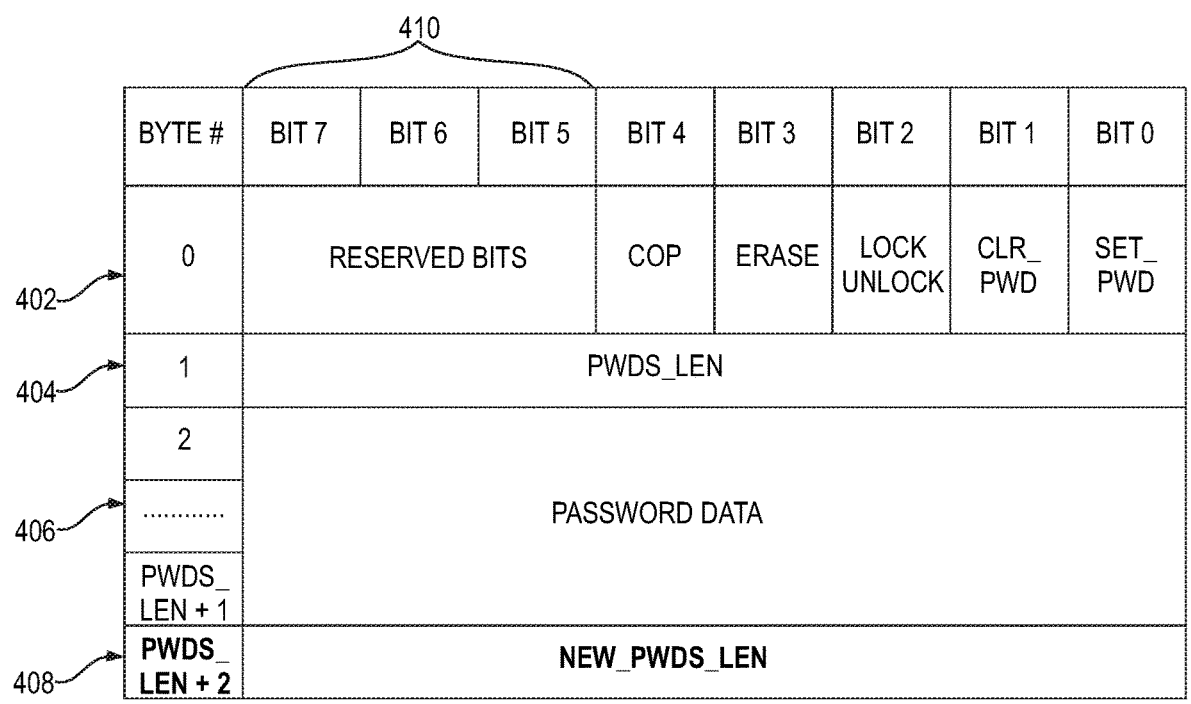
FIG. 4 is a representation of a locked card data structure in compliance with the SD standard, in accordance with some embodiments.

Referring now to FIG. 4, a locked card data structure 400 is shown, in accordance with one embodiment. The locked card data structure 400 maybe compliant with the SD standard. It shall be noted that the locked card data structure 400 is an improved version of the locked card data structure 200 of FIG. 2. The locked card data structure 400 includes byte fields, such as byte field 402, PWDS_LEN byte field 404, and password data field 406, which are similar to the byte field 202, the PWDS_LEN byte field 204, and the password data field 206, respectively, in terms of basic architecture, and hence these byte fields are not explained herein again for the sake of brevity. In the locked card data structure 400, a new byte field (NEW_PWDS_LEN) 408 is introduced. The new byte field 408 represents a user-defined password length ($L_{USER}$) of the new password. Further, in order to maintain backward compatibility with the SD standard, one of the reserved bits 410 included in the byte field 402 may be set to a bit value '1'. For instance, in an example, bit 5 of the byte field 402 may be set to a bit value '1', which indicates that the new byte field 408 should be considered before resetting a current password.

Figure 5:
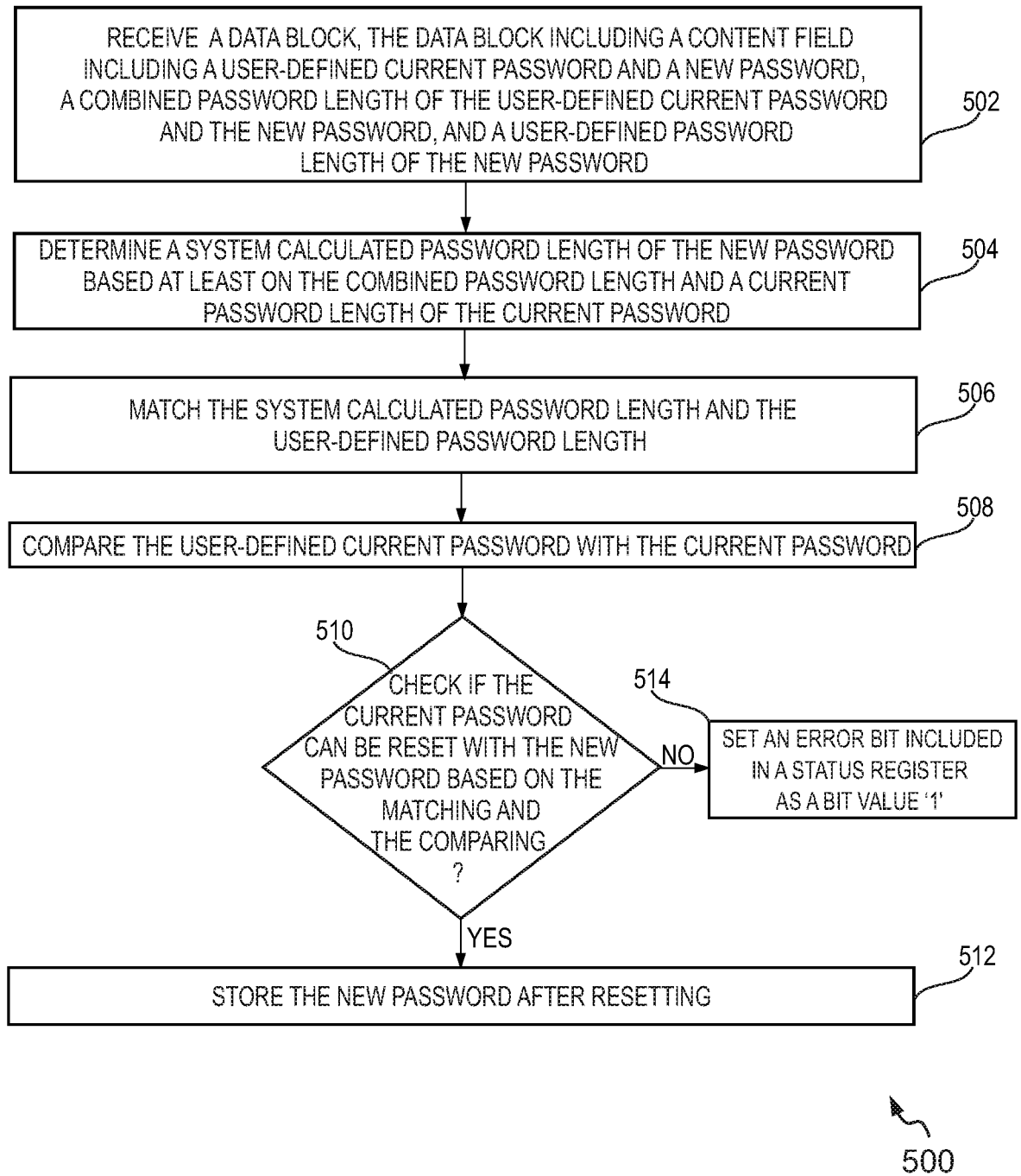
FIG. 5 is a flow chart of a method for resetting a current password of a memory device, in accordance with some embodiments.

Referring now to FIG. 5, a flow chart of a method 500 for resetting a current password of a memory device is shown, in accordance with an example embodiment. The method 500 is described with reference to a memory device. The memory device may include a non-volatile memory and a controller. In at least one implementation, the non-volatile memory is a flash memory, an SD memory card or a micro-SD memory card. One or more operations of method 500 may be performed by the controller executing machine-executable instructions in a non-transitory machine-readable medium by a computer, hardware, a processor (e.g., a microprocessor), and/or machine. The memory device is controlled by a host device, which typically includes a data processing device, such as a central processing unit (CPU), a processor, a microprocessor, or an application specific processor, which can process data. The data processing device may be embedded or implemented in an electronic device, for example, a personal computer (PC), a laptop computer, a mobile telephone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book.

The method 500 is explained by taking an example of the SD card and the SD standard, however, the method 500 can be applied to other forms of memory devices and standards as well.

Operation 502 of the method 500 includes receiving a data block from the host device. The data block includes a command register, a content field including a user-defined current password followed by a new password, a combined password length of the user-defined current password and the new password, and a user-defined password length ($L_{USER}$) of the new password. The combined password length ($L_{COMB}$) indicates a sum of password lengths of the user-defined current password ($L_{USER}$) and the new password. More specifically, $L_{COMB}$ can be understood as equal to the number of characters in the user-defined current password and the new password provided in the PWDS_LEN byte field 404 (e.g., number of characters in the password data field 406 of the locked card data structure 400).

Operation 504 includes determining a system calculated password length ($L_{SYS}$) of the new password based at least on the combined password length ($L_{COMB}$) and a length ($L_{CURRENT}$) of the current password. The current password is retrieved from the memory 108. Herein, the system calculated password length ($L_{SYS}$) of the new password is calculated by subtracting the current password length ($L_{CURRENT}$) of the current password from the combined password length ($L_{COMB}$).

Operation 506 includes matching the system calculated password length ($L_{SYS}$) and the user-defined password length ($L_{USER}$) of the new password. Operation 508 includes comparing the contents of the user-defined current password and the current password.

Operation 510 of the method 500 includes checking if the current password can be reset with the new password based on the steps of the matching and the comparing (operations 506 and 508). For instance, the current password is reset only when the system calculated password length ($L_{SYS}$) matches with the user-defined password length ($L_{USER}$), and the contents of user-defined current password and the current password are the same. If the reset condition (at operation 510) is satisfied, the method 500 proceeds to operation 512. If the reset condition is not satisfied, the method 500 proceeds to operation 514.

At operation 512, the current password is replaced with the new password, and the new password is stored in the memory 108. At operation 514, the method 500 includes setting a Lock_Unlock_Failed error bit present in a status register as a bit value '1' based on occurrence of at least one of: the system calculated password length ($L_{SYS}$) being different than the user-defined password length ($L_{USER}$); and the user-defined current password being different than the current password. Since the SD card is only reset when the $L_{USER}$ is same as the $L_{SYS}$ and the contents of the user-defined current password and the current password match, reset of the SD card with unknown or incorrect passwords is avoided, as explained with reference to FIGS. 6A to 6C.

An example of password reset of an SD card is illustrated in FIG. 6A according to one embodiment. The user intends to reset a current password i.e. "123" (see, 602 in FIG. 6B) of the SD card (e.g., memory device 700 shown in FIG. 7). The user enters a user-defined current password (see, 604 of FIG. 6A), via a user interface, on a host device (e.g., host device 720 shown in FIG. 7). The user-defined current password is an incorrect current password, for example, it includes the current password with an extra character. For instance, the actual current password is "123", and the user provides the user-defined current password as "1234", which has an extra character i.e. "4". The user also provides a new password i.e. "3456" and a user-defined password length ($L_{USER}$) of the new password i.e. "4" (see, 606 in FIG. 6A). The host device generates a data block, and sends the data block to a controller (e.g., controller 702 shown in FIG. 7) of the memory device 700. The controller calculates a system calculated password length ($L_{SYS}$) of the new password by subtracting (see, 608 in FIG. 6A) the current password length ($L_{CURRENT}$) from a combined password length ($L_{COMB}$) i.e. "8" accessed from the PWDS_LEN byte field 404 received in the data block. The controller determines if the user-defined password length ($L_{USER}$) and the system calculated password length ($L_{SYS}$) are same. The controller also compares the contents of the user-defined current password and the current password. As illustrated in the example of FIG. 6A, the user-defined password length ($L_{USER}$) i.e. "4" and the system calculated password length ($L_{SYS}$) i.e. "5" of the new password are not equal (see, 610 in FIG. 6A). Therefore, a Lock_Unlock_Failed error bit is set present in the status register and the password reset of the memory device is not successful (see, 612 in FIG. 6A).

Another example of password reset of the SD card is illustrated in FIG. 6B according to one embodiment. The user intends to reset a current password i.e. "123" (see, 632 in FIG. 6B) of the SD card. The user enters a user-defined current password i.e. "12" which is a current password i.e. "123" with a skipped character (see, 634 in FIG. 6B). The user also provides a new password and a user-defined password length ($L_{USER}$) of the new password (see, 636 in FIG. 6B). The new password starts with the skipped character i.e. "3" of the current password. For instance, the new password is "3456" and the user provides the user-defined password length ($L_{USER}$) as "4". The host device generates and sends a data block to the controller 106. The controller calculates a system calculated password length ($L_{SYS}$) of the new password by subtracting (see, 638 in FIG. 6A) current password length ($L_{CURRENT}$) from a combined password length field ($L_{COMB}$) i.e. "6" accessed from the PWDS_LEN byte field 404 received in the data block. The controller determines if the user-defined password length ($L_{USER}$) and the system calculated password length ($L_{SYS}$) are same. The controller further compares the contents of the user-defined current password and the current password. As illustrated in the example of FIG. 6B, the user-defined password length ($L_{USER}$) i.e. "4" and the system calculated password length ($L_{SYS}$) i.e. "3" of the new password are not equal. Hence, the matching does not occur (see, 640 in FIG. 6B), and a Lock_Unlock_Failed error bit is set present in the status register and the password reset of the memory device is not successful. Thus, the embodiments described herein avoid incorrect password reset issue in the memory card system such as the SD card, which occurs in password resetting method in the existing SD standard. The embodiments described herein facilitate setting an error bit in a status register, whenever the user-defined password length ($L_{USER}$) and the system calculated password length ($L_{SYS}$) are different and contents of user-defined current password and the new password are different. Hence, the embodiments described herein enhance security of the memory card system by setting the error bit, and prevent unauthorized resetting attempts.

Figure 6C:
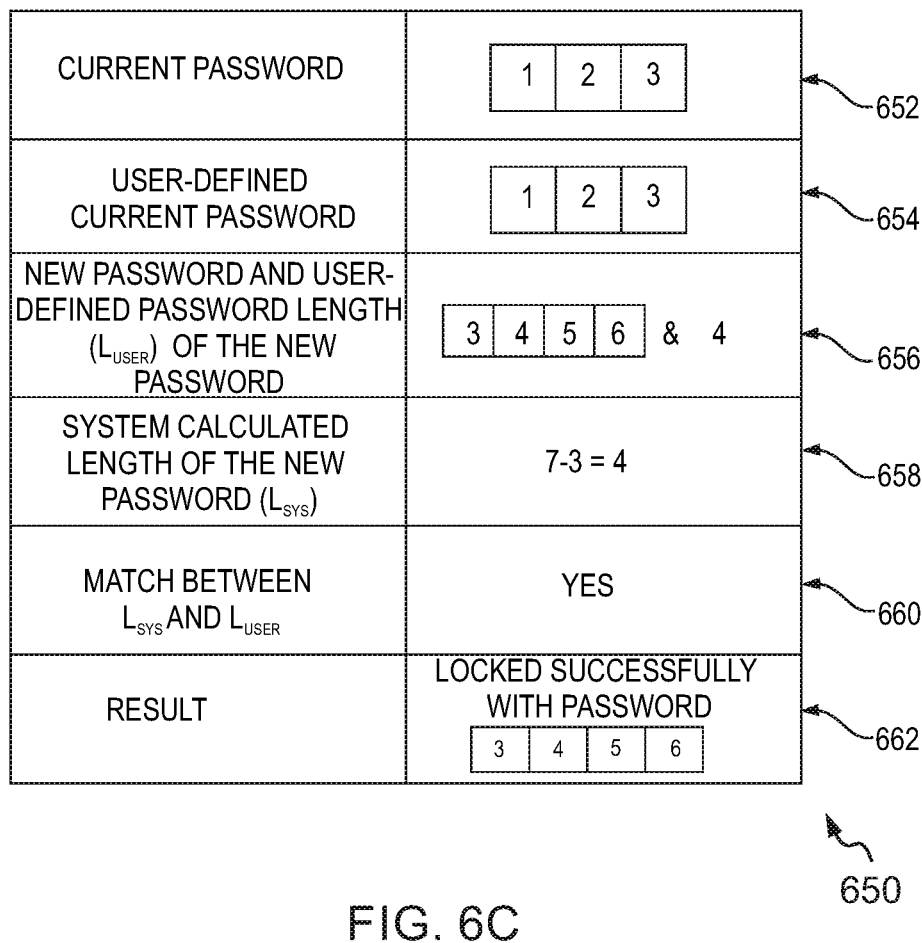

Another example of password reset of the SD card is illustrated in FIG. 6C according to an embodiment. The user intends to reset a current password i.e. "123" of the SD card. The user enters a user-defined current password i.e. "123" (see, 654 in FIG. 6C). The user also provides a new password and a user-defined password length ($L_{USER}$) of the new password (see, 656 in FIG. 6C). For instance, the new password is "3456" and the user provides the user-defined password length ($L_{USER}$) as "4". The host device generates and sends a data block to the controller. The controller calculates a system calculated password length ($L_{SYS}$) of the new password by subtracting current password length ($L_{CURRENT}$) from a combined password length field i.e. "7" received in the data block (see, 658 in FIG. 6C). The controller determines a match between the user-defined password length ($L_{USER}$) and the system calculated password length ($L_{SYS}$) of the new password. The controller also compares the content of user-defined current password and the content of the current password. As illustrated in FIG. 6C, the user-defined password length ($L_{USER}$) i.e. "4" and the system calculated password length ($L_{SYS}$) i.e. "4" of the new password are equal. Further, the content of the user-defined current password and the content of the current password are also same. Hence, based on the result of matching and comparing steps, the password reset of the memory device is successful reset with the new password i.e. "3456" (see, 660 and 662 in FIG. 6C).

Figure 7:
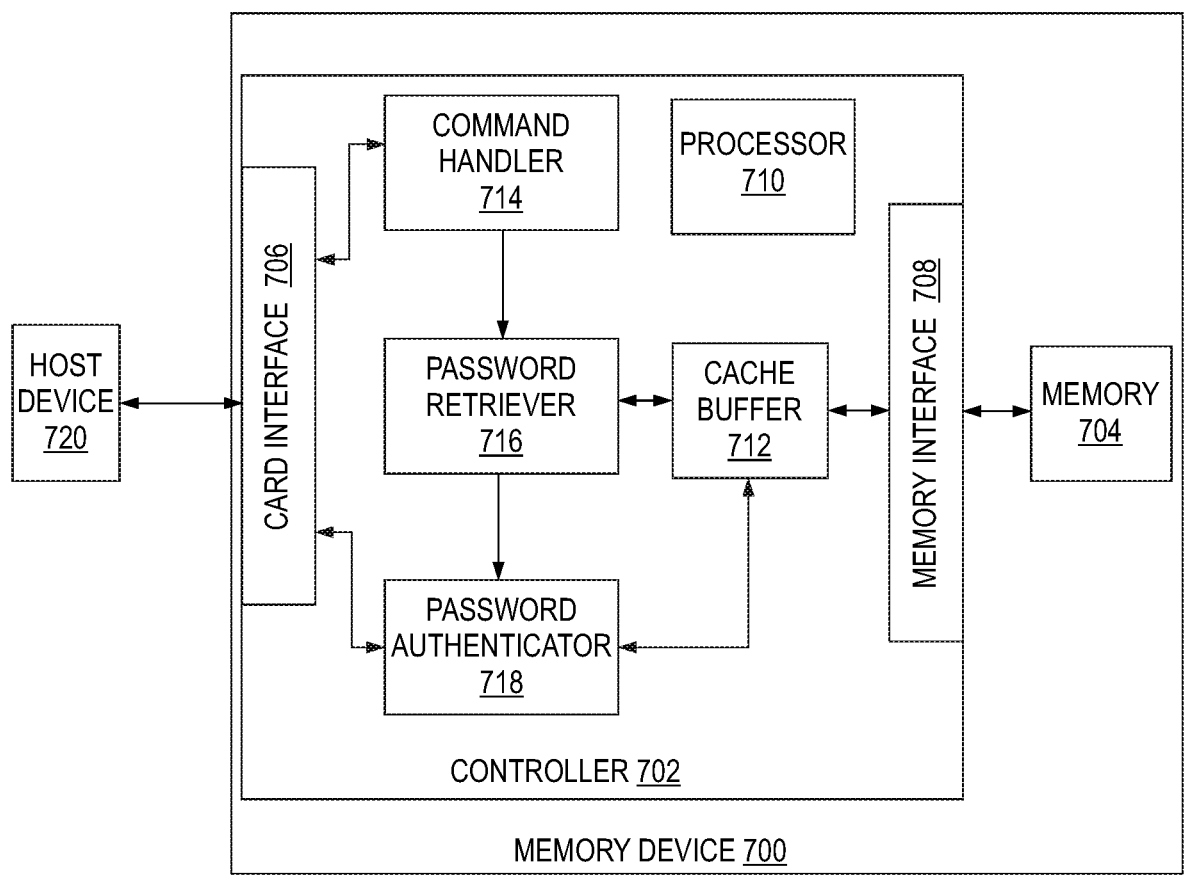
FIG. 7 is a block diagram of a memory device, in accordance with some embodiments.

Referring now to FIG. 7, a memory device 700 is illustrated, in accordance with one embodiment. The memory device 700 complies with the SD standard. The memory device 700 includes a control means such as a controller 702 and a memory 704. The controller 702 manages operations of the memory device 700, such as writes to and reads from a memory 704. The controller 702 interfaces with a host device 720 via a card interface 706. The card interface 706 may have MAC and PHY components. The controller 702 interfaces with the memory 704 though a memory interface 708. The controller 702 includes a micro-controller or a processor 710. In an example, the processor 710 may handle the components of the memory device 700 through firmware code. In the depicted embodiment, the controller 702 also includes a volatile memory, such as one or more cache buffer(s) 712 included in the controller 702, for short-term storage or temporary memory during read/write operation of the memory device 700. The cache buffer 712 does not retain stored data if powered off.

The controller 702 also includes a command handler 714, a password retriever 716, and a password authenticator 718. In the depicted embodiment, the controller 702 is configured to receive a data block from the host device 720 via the card interface 706. The command handler 714 is configured to parse the data block and provide a content field of a user-defined current password followed by a new password and a combined password length ($L_{COMB}$) of the user-defined current password and the new password, and a user-defined password length ($L_{USER}$) of the new password to the password retriever 716. The password retriever 716 is configured to provide the parsed data block information to the password authenticator 718. Further, the password retriever 716 is configured to retrieve current password information from the memory 704 through the cache buffer 712 and provide the current password information to the password authenticator 718. The password authenticator 718 is configured to determine a system calculated password length ($L_{SYS}$) of the new password based at least on the combined password length ($L_{COMB}$) and a current password length ($L_{CURRENT}$) of the current password. The password authenticator 718 is configured to calculate the system calculated password length ($L_{SYS}$) by subtracting the current password length ($L_{CURRENT}$) from the combined password length ($L_{COMB}$).

The password authenticator 718 is configured to match the system calculated password length ($L_{SYS}$) and the user-defined password length ($L_{USER}$) of the new password. Further, the password authenticator 718 is configured to compare the user-defined current password and the current password. Based on the match and the comparison, the controller 702 is configured to reset the current password with the new password. The resetting is performed only when the system calculated password length ($L_{SYS}$) of the new password matches with the user-defined password length ($L_{USER}$) of the new password and the user-defined current password and the current password are same. If the resetting occurs, the controller 702 is configured to store the new password into the memory 704. If the resetting does not occur, the controller 702 is configured to set Lock_Unlock_Failed error bit present in a status register as a bit value '1'. Such reset processes are already explained with reference to FIGS. 6A to 6C.

In an embodiment, the controller 702 is also configured to send a response signal to the host device 720 when resetting does not occur.

In an example, a memory card system includes a control means operatively coupled to a memory for replacing a current password of the memory. The control means includes means for receiving a data block via a card interface. The data block includes at least a content field including a user-defined current password and a new password, a combined password length of the user-defined current password and the new password, and a user-defined password length of the new password. The control means further includes means for determining a system calculated password length of the new password based at least on the combined password length and a length of the current password, and means for matching the system calculated password length and the user-defined password length, and means for comparing the user-defined current password with the current password. The control means also includes means for replacing the current password with the new password based on the operations of matching and the comparison. Some examples of the means described herein include, but are not limited to, the command handler 714, the password retriever 716, and the password authenticator 718, a card interface, a host interface, or any other processing components to perform the functionalities described herein.

Figure 8:
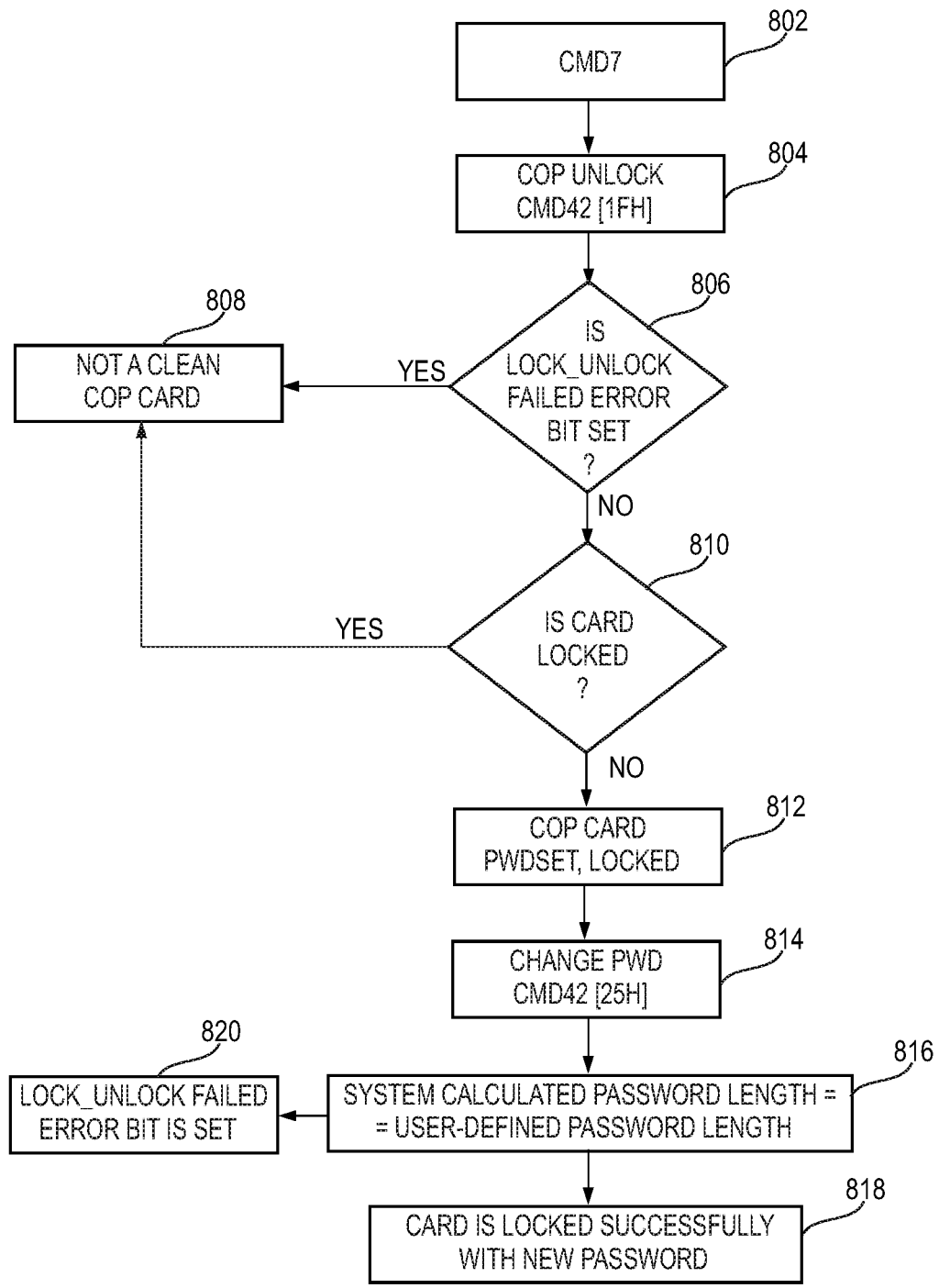
FIG. 8 is a flow chart of a method for resetting a current password for Content Ownership Protection (COP) secure digital (SD) card, in accordance with some embodiments.

Referring now to FIG. 8, a flow chart of resetting current password for a COP memory card is disclosed in accordance with various embodiments. The host device 720 sends the CMD7 command for selecting a memory device card from a plurality of memory cards (S802). The host device 720 then sends CMD42 command with argument "1FH" for unlocking the COP memory card (S804). The status of a Lock_Unlock Failed error bit in a status register is determined (S806). If the Lock_Unlock_Failed error bit present in the status register is set (S806=Yes), the memory card is called as "not a clean COP memory card" (S808). If the Lock_Unlock Failed error bit is not set, the COP card locking status (S810) is determined. When the COP memory card is locked (S810=Yes), it means that the COP memory card is locked with a password (S812). When the card is unlocked (S810=No), the COP memory card is called as "not a clean COP memory card" (S808).

Thereafter, for resetting the current password, the host device 720 sends a data block (S814) to the COP memory card. The data block includes a command register (with argument "25H"), a content field of a user-defined current password and a new password, a combined password length ($L_{COMB}$) of the user-defined current password and the new password, and a user-defined password length ($L_{USER}$) of the new password. At S816, a match between the user-defined password length ($L_{USER}$) of the new password and a system calculated password length ($L_{SYS}$) is determined. If the matching occurs (S816=Yes), the COP memory card is locked with the new password successfully and password resetting is successful (S818). If the matching does not occur (S816=No), the Lock_Unlock_Failed bit present in the status register is set to a bit value '1' (S820).

Figure 9:
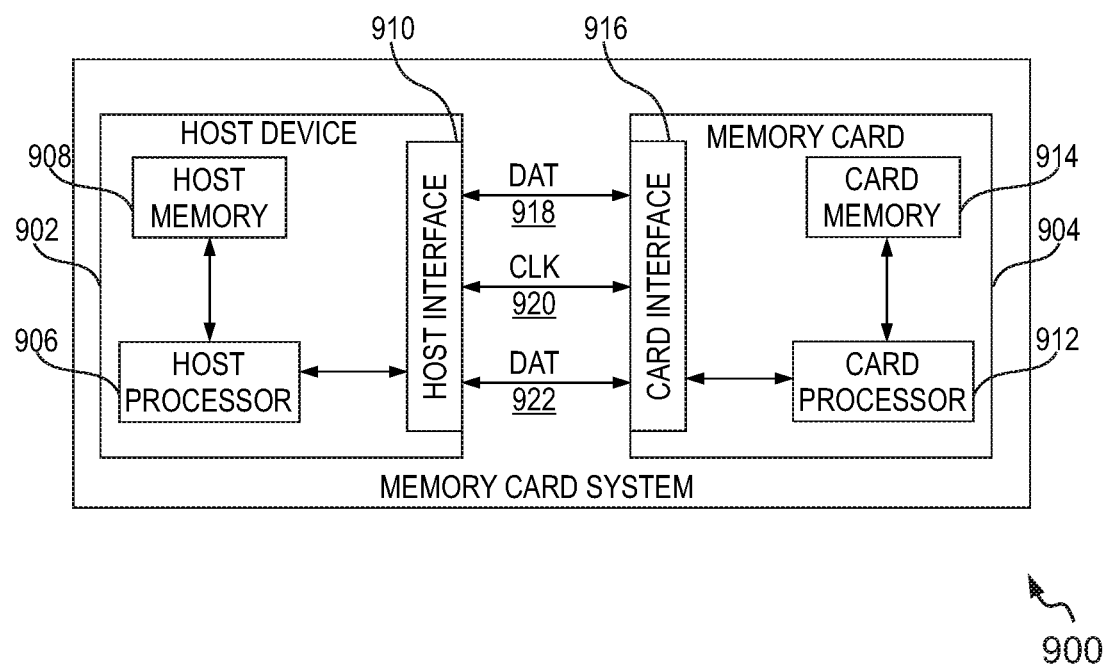
FIG. 9 is a block diagram of a memory card system, in accordance with some embodiments.

Referring now to FIG. 9, a memory card system 900 is illustrated, in accordance with another embodiment. The memory card system operates in compliance with the SD standard. The memory card system 900 includes a host device 902 and a memory card 904. The host device 902 includes a host processor 906, a host memory 908, and a host interface 910. The memory card 904 includes a card processor 912, a card memory 914, and a card interface 916. The memory card 904 may be a secure digital (SD) memory card or a micro-SD memory card. Alternatively, the memory card 904 may be other types of memory cards such a Multi-Media Card (MMC). The host device 902 and the memory card 904 may communicate using SD bus protocol as described in the SD standard. In one example implementation, the host device 902 may have an SD slot and have SD driver software installed thereon to control the operation of the memory card 904. The host device 902 is an electronic device using the memory card 904 inserted therein. The card interface 916 makes electrical connection with the host interface 910 when the memory card 904 is inserted into the host device 902. A data line 918 connects a respective data pin of the host interface 910 with a respective data pin of the card interface 916. A clock line 920 connects a respective clock pin of the host interface 910 with a respective clock pin of the card interface 916. A command line 922 connects a respective command pin of the host interface 910 with a respective command pin of the card interface 916.

The host device 902 generates a data block and transmits the data block to the memory card 904 via the data line 918. The data block includes a command register, a content field including a user-defined current password followed by a new password, a combined password length ($L_{COMB}$) of the user-defined current password and the new password, and a user-defined password length ($L_{USER}$) of the new password. The combined password length ($L_{COMB}$) indicates a sum of password length of the user-defined current password and the new password.

The card processor 912 receives the data block via the card interface 916. The card processor 912 determines a system calculated password length ($L_{SYS}$) of the new password based at least on the combined password length and a current password length of the current password. The system calculated length of the new password is calculated by subtracting the current password length from the combined password length.

The card processor 912 matches the system calculated password length ($L_{SYS}$) and the user-defined password length ($L_{USER}$) of the new password and compares the user-defined current password with the current password. The card processor 912 resets the current password with the new password when the system calculated password length ($L_{SYS}$) of the new password matches with the user-defined password length ($L_{USER}$) of the new password and the user-defined current password and the current password are same.

Figure 10:
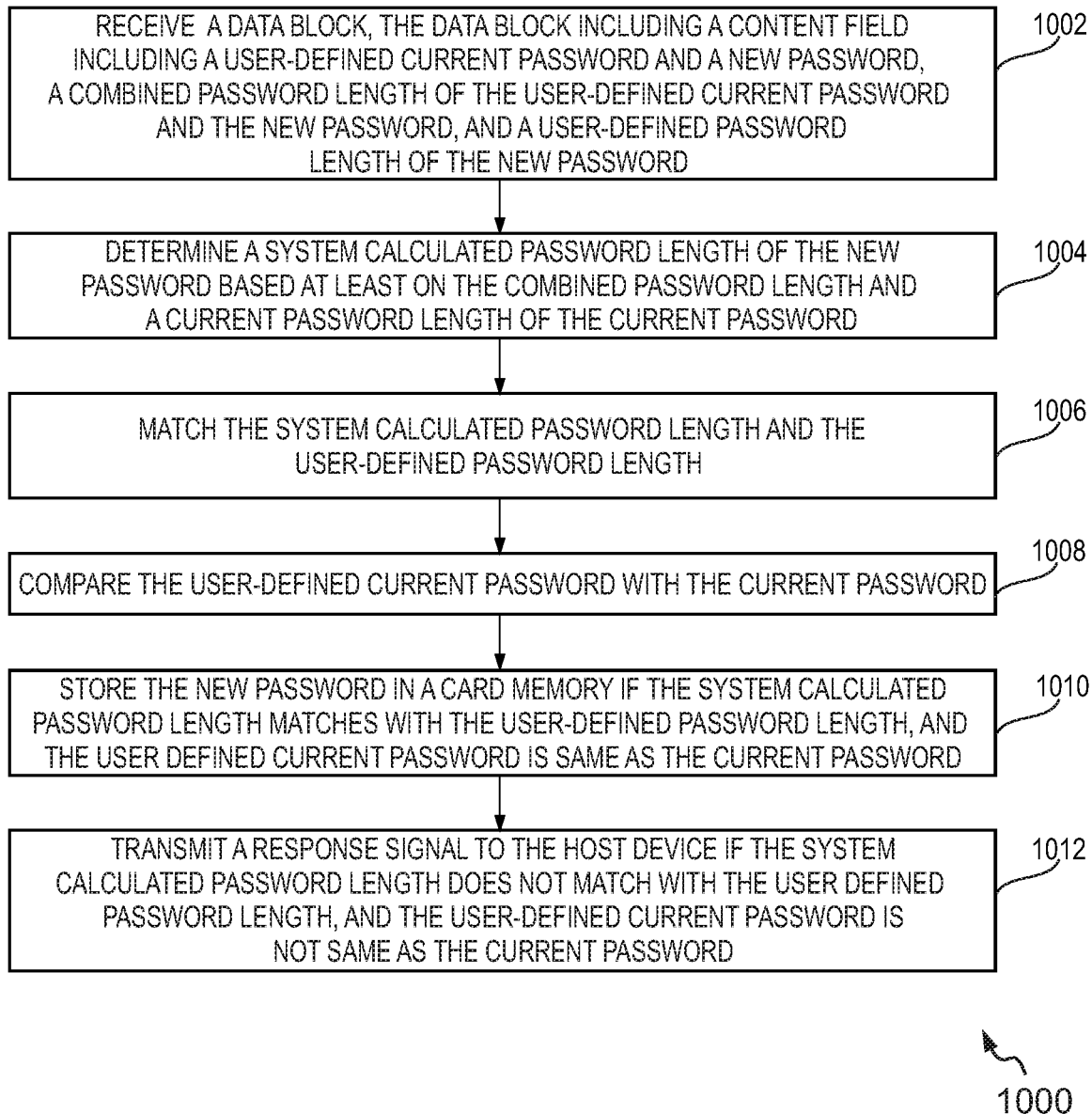
FIG. 10 is a flow chart of a method for resetting a current password of a memory device, in accordance with some alternative embodiments.

Referring now to FIG. 10, a flow chart of a method 1000 for resetting a current password of the memory card 904, is shown in accordance with another embodiment.

Operation 1002 of the method 1000 includes receiving a data block from the host device 902. The data block includes a command register, a content field including a user-defined current password followed by a new password, a combined password length ($L_{COMB}$) of the user-defined current password and the new password, and a user-defined password length ($L_{USER}$) of the new password. The combined password length indicates a sum of password length of the user-defined current password and the new password. In an example, it may be assumed that the actual current password is "587". In an example, the data block may include the user-defined current password as "5874", which has an extra character i.e. "4". The data block also includes a new password i.e. "3456" and a user-defined password length ($L_{USER}$) of the new password i.e. "4", and the data block also includes a combined password length ($L_{COMB}$) as "8".

Operation 1004 includes determining a system calculated password length ($L_{SYS}$) of the new password based at least on the combined password length ($L_{COMB}$) and a current password length of the current password. The current password is retrieved from the memory device. Herein, the system calculated length of the new password is calculated by subtracting the current password length ($L_{CURRENT}$) from the combined password length ($L_{COMB}$). In the above example, the $L_{sys}$ is calculated as 5 obtained by subtracting 3 from 8.

Operation 1006 includes matching the system calculated password length ($L_{SYS}$) and the user-defined password length ($L_{USER}$). Operation 1008 includes comparing the user-defined current password with the current password. It should be noted that the operations 1006 and 1008 can be performed in any order or simultaneously. In this example, the $L_{SYS}$ (5) and $L_{USER}$ (4) do not match, and the password reset operation is not performed for the SD card.

At operation 1010, the method includes storing the new password in a card memory 914 when the system calculated password length ($L_{SYS}$) matches with the user-defined password length ($L_{USER}$), and the user-defined current password is same as the current password.

Further, at operation 1012, the method includes transmitting a response signal to the host device 902 when the system calculated password length ($L_{SYS}$) does not match with the user-defined password length ($L_{USER}$), and the user-defined current password is not same as the current password.

Various embodiments described herein offer multiple advantages and technical effects. For instance, the described embodiments utilize a new command data block structure to avoid incorrect password resetting problem, while resetting current password. As described earlier, there is a drawback in the SD standard that the SD cards are getting locked with a system defined password while resetting the password. Therefore, the user may never know about the system defined password and therefore this may lead to the SD card in an inoperable state. According to the embodiments described herein, by utilizing the user-defined password length ($L_{USER}$) of the new password, the controller matches the user-defined password length ($L_{USER}$) with the system calculated length. If the match does not occur, the controller is configured to set an error bit present in a status register. Further, the embodiments described herein also enhances data security of the memory card system. Hence, drawbacks for locking/unlocking command in the SD standard can be avoided by the teachings of the various embodiments described herein.

As used here, the term "SD standard" used throughout the description refers to the "SD Flash Memory Card" standard introduced by Matsushita®, SanDisk®, and Toshiba® in the year 2000 and subsequent revisions to the standard including the latest revision as set forth in Secure Digital Association Physical Layer Specification version 6.0 issued by the SD card association dated Dec. 8, 2016.

Further, as used herein, the term "user-defined" used throughout the description refers to values defined by or entered by a user. For instance, "user-defined current password" may be understood as a current password that is provided by the user via a user interface. Further, "user-defined password length" refers to a password length that is provided by the user. For example, the term "user-defined" can also refer to values that are calculated by an automated or semi-automated system or means.

Although the present technology has been described with reference to specific exemplary embodiments, it is noted that various modifications and changes may be made to these embodiments without departing from the broad spirit and scope of the present technology. For example, the various systems, modules, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine-readable medium). For example, the various modules and methods may be embodied using transistors, logic gates, and electrical circuits (e.g., application specific integrated circuit (ASIC) circuitry and/or in Digital Signal Processor (DSP) circuitry).

Also, techniques, subsystems and methods described and illustrated in the various embodiments as discrete or separate may be combined or integrated with other systems, modules, techniques, or methods without departing from the scope of the present technology. Other items shown or discussed as directly coupled or connected with one another, or as directly communicating with each other, may be communicatively associated through some interface or device, such that the items may no longer be considered directly coupled or connected with one another, or directly communicating with each other, but may still be indirectly communicatively associated and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment. Various embodiments described herein may be practiced with steps and/or operations in a different order, and/or with hardware elements in configurations that are different from those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The foregoing Detailed Description has been presented for purposes of illustration and description. It is not intended to be exhaustive or to limit the disclosure to the precise form described. Many modifications and variations are possible in light of the above teaching. The described embodiments were chosen to explain the principles of the disclosure and its practical application, to thereby enable others skilled in the art to best utilize the disclosure in various embodiments and with various modifications as are suited to the particular use contemplated.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of resetting a current password for a memory device, the method comprising:
    receiving a data block from a host device, the data block comprising at least (a) a content field including a user-defined current password and a new password, (b) a combined password length of the user-defined current password and the new password, and (c) a user-defined password length of the new password;
    determining a system calculated password length of the new password based at least on the combined password length and a current password length of the current password;
    matching the system calculated password length and the user-defined password length;
    comparing the user-defined current password with the current password; and
    resetting the current password with the new password based on a result of the matching and a result of the comparing.

2. The method of claim 1, wherein the memory device is a secure digital (SD) memory card that operates in compliance with an SD standard.

3. The method of claim 1, further comprising storing the new password after the resetting step, wherein the resetting step is performed when the system calculated password length matches the user-defined password length, and the user-defined current password is the same as the current password.

4. The method of claim 1, wherein determining the system calculated password length of the new password comprises subtracting the current password length from the combined password length.

5. The method of claim 1, further comprising setting an error bit stored in a status register based on occurrence of at least one of:
the system calculated password length being different from the user-defined password length; and
the user-defined current password being different from the current password.

6. The method of claim 1, wherein the memory device is a content ownership protection (COP) secure digital (SD) card.

7. The method of claim 1, wherein the data block further comprises a command register, and wherein at least one reserved bit of the command register is set to indicate presence of the user-defined password length of the new password in the data block.

8. A memory device, comprising:
a memory for storing data; and
a controller operatively coupled to the memory via a memory interface, the controller configured to:
receive a data block from a host device via a card interface, the data block comprising at least (a) a content field of a user-defined current password and a new password, (b) a combined password length of the user-defined current password and the new password, and (c) a user-defined password length of the new password,
determine a system calculated password length of the new password based at least on the combined password length and a current password length of a current password,
match the system calculated password length and the user-defined password length,
compare the user-defined current password with the current password, and
reset the current password with the new password based on a result of the match and a result of the comparing.

9. The memory device of claim 8, wherein the memory device is a secure digital (SD) memory device that operates in compliance with an SD standard.

10. The memory device of claim 8, wherein the controller comprises at least one of:
a command handler for parsing the received data block;
a password retriever for retrieving the current password from the memory; and
a password authenticator for receiving parsed data block information and determining the system calculated password length by subtracting the current password length from the combined password length.

11. The memory device of claim 10, wherein the password authenticator is configured to set an error bit stored in a status register based on occurrence of at least one of:
the system calculated password length being different than the user-defined password length, and
the user-defined current password being different than the current password.

12. The memory device of claim 8, wherein the controller is configured to store the new password in the memory after the reset of the current password, and wherein the resetting is performed when the system calculated password length matches the user-defined password length, and the user-defined current password is the same as the current password.

13. The memory device of claim 8, wherein the controller is configured to calculate the system calculated password length by subtracting the current password length of the current password from the combined password length.

14. The memory device of claim 8, wherein the controller is configured to retrieve the current password from the memory via the memory interface.

15. The memory device of claim 8, wherein the memory device is a content ownership protection (COP) secure digital (SD) card.

16. The memory device of claim 8, wherein the data block further comprises a command register, and wherein at least one reserved bit of the command register is set to indicate presence of the user-defined password length of the new password in the data block.

17. A memory card system, comprising:
a memory card comprising a memory for storing data; and
a control means operatively coupled to the memory by way of a memory interface, wherein the control means comprises means for:
receiving a data block via a card interface, wherein the data block comprises at least (a) a content field of a user-defined current password and a new password, (b) a combined password length of the user-defined current password and the new password, and (c) a user-defined password length of the new password,
determining a system calculated password length of the new password based at least on the combined password length and a current password length of a current password,
matching the system calculated password length and the user-defined password length,
comparing the user-defined current password with the current password, and
replacing the current password with the new password based on a result of the matching and a result of the comparing.

18. The memory card system of claim 17, wherein the control means further comprises means for storing the new password into the memory after replacing, wherein the replacing is performed when the system calculated password length matches the user-defined password length, and the user-defined current password is the same as the current password.

19. The memory card system of claim 17, further comprising a host device, wherein the host device comprises:
a host processor; and
a host memory having a sequence of instructions stored thereon, wherein execution of the sequence of instructions causes the host processor to generate the data block and transmit the data block from the host device to the memory card via a host interface.

20. The memory card system of claim 17, wherein the memory card is a secure digital (SD) memory card and the memory card system operates in compliance with an SD standard.

* * * * *